US006717514B1

(12) United States Patent
Stein et al.

(10) Patent No.: US 6,717,514 B1
(45) Date of Patent: Apr. 6, 2004

(54) ALARM SYSTEM AND METHOD

(76) Inventors: Richard M. Stein, 4521 Tower Dr., Greensboro, NC (US) 27410; Lynwood F. Hampshire, 10498 NC Hwy. 150, Reidsville, NC (US) 27320

( * ) Notice: Subject to any disclaimer, the term of this patent is extended or adjusted under 35 U.S.C. 154(b) by 89 days.

(21) Appl. No.: 10/196,999

(22) Filed: Jul. 17, 2002

(51) Int. Cl.[7] .................................................. G08B 1/08
(52) U.S. Cl. ............................ 340/539.1; 340/539.23; 340/550; 340/565; 340/567; 340/573.4; 340/686.6; 340/679; 361/179
(58) Field of Search .......................... 340/528, 539.11, 340/539.13, 539.23, 541, 550, 565, 567, 573.4, 686.6, 680, 679; 361/179

(56) References Cited

U.S. PATENT DOCUMENTS

| | | | |
|---|---|---|---|
| 4,849,735 A | * 7/1989 | Kirtley et al. | ............ 340/539.1 |
| 4,973,944 A | * 11/1990 | Maletta | .................... 340/568.1 |
| 5,148,053 A | 9/1992 | Dubois, III | |
| 5,315,289 A | 5/1994 | Fuller et al. | |
| 5,436,613 A | 7/1995 | Ghosh et al. | |
| 5,486,691 A | 1/1996 | Dieterle | |
| 5,563,581 A | 10/1996 | Kats | |
| 5,575,242 A | 11/1996 | Davis et al. | |
| 5,579,884 A | 12/1996 | Appleyard et al. | |
| 5,669,809 A | 9/1997 | Townsend | |
| 5,796,341 A | 8/1998 | Stratiotis | |
| 5,988,645 A | 11/1999 | Downing | |
| 6,043,748 A | 3/2000 | Touchton et al. | |
| 6,064,308 A | 5/2000 | Janning et al. | |
| 6,122,039 A | 9/2000 | Schumacher | |

OTHER PUBLICATIONS

Industrial Technology, Choosing and using light guards (3 pgs) Sep. 1998.
Rockford Systems, Inc., Stop–Time Measurement Devices (1 pg) undated.
Rockford Systems, Inc., Press Brake Safeguarding (2 pgs) undated.
Rockford Systems, Inc., Auxiliary Press Brake Safeguarding (3 pgs) undated.
Presence Sensing Devices (3 pgs) undated.
Nelsa Products, Safety Mats & Controllers (3 pgs) undated.
SICK Proximity Laser Scanner (8 pgs) undated.
Pilz Products, Programmable Safety System (2 pgs) undated.
Halliburton, Scan 3 Data Acquisition & Emergency Shutdown System (4 pgs) undated.
Articles 15–22 (devices and systems) were all known and commercially available before the conception of the present invention.

* cited by examiner

Primary Examiner—Daryl Pope

(57) ABSTRACT

An alarm system and method is provided for preventing injuries as may occur within a manufacturing plant using lathes, milling equipment, metal shears and other machinery. The alarm system is so positioned to allow safe operation of the machinery while tracking the operator's movement. A transmitter attached to the operator's hand allows monitoring of the operator and prevents unsafe actuation of the machinery. The alarm system can also be programmed to prevent operation by unauthorized personnel and includes a trio of X, Y and Z spatially positioned receivers which are connected to a programmed system controller to activate alarms or to terminate power to the machinery.

20 Claims, 3 Drawing Sheets

ALARM SYSTEM AND METHOD

FIELD OF THE INVENTION

The invention herein pertains to alarm systems, and particularly for a computer operated alarm system to prevent injury while operating machinery such as milling machines, presses, lathes, metal shears and the like.

DESCRIPTION OF THE PRIOR ART AND OBJECTIVES OF THE INVENTION

In order to help prevent injuries to personnel in industrial environments, barrier guards have been used for many years on and around various machinery to prevent accidental body contact. Other conventional safety devices include pull-back restraints, light curtains, two hand activation switches, safety mats, photocell operated shut off switches and the like. While all of the aforementioned safety equipment is useful in particular circumstances, all have shortcomings and limitations which reduce their effectiveness. For example, the use of barrier guards and fences around equipment is often circumvented by workers for convenience. Actuation devices requiring two hands are often bypassed by overriding one or both switches. Light curtains, safety mats and the like are sometimes avoided by employees that prefer to take a risk, as opposed to utilizing the available safety features for accident prevention.

Thus, with the inconveniences and shortcomings of available safety and alarm systems well documented, the present invention was conceived and one of its objectives is to provide an alarm system and method which is versatile and can be readily adapted to any of a variety of equipment or machinery in a particular operating environment.

It is another objective of the present invention to provide an alarm system which is computer controlled and can be programmed, installed and easily adjusted as needed.

It is yet another objective of the present invention to provide an alarm system and method for preventing injury to personnel which is relatively inexpensive to purchase, setup and operate.

It is still another objective of the present invention to provide an alarm system which has a plurality of alarm zones to warn personnel by the degree of impending danger.

It is yet another objective of the present invention to provide an alarm system which can be suited to a single machinery operator or can be adjusted to encompass others that may enter a prescribed tracking zone.

Various other objectives and advantages of the present invention will become apparent to those skilled in the art as a more detailed description is set forth below.

SUMMARY OF THE INVENTION

The alarm system and method described herein provides a tracking zone proximate selected machinery or equipment as desired. Within the tracking zone is an alarm zone whereby a transmitter as worn by, for example, a machine operator can be monitored to prevent operator injury. The preset tracking and alarm zones are defined by a trio of receivers available for signals directed from the transmitter such as worn on the arm of a machine operator. Should the operators arm penetrate a defined zone, a visual or audible alarm is activated. If the operator's arm penetrates a final, innermost alarm zone the receivers will send signals to the system controller which will turn the power to the machinery off, thus preventing injury to the operator.

Receivers are mounted to selected machinery in a fixed manner during system setup to establish a broad tracking zone to monitor the operator's movements. Also, the axis for a desired cylindrical alarm zone is completed in a "teaching" mode using a programmed interface connected to a system controller. Thus, by positioning a transmitter at one point along a desired alarm zone axis a recording of its location is made. The transmitter is repositioned and the second point along the alarm zone axis is also recorded. This location information is saved under a specific identity within the machinery description file in the database of the system controller. The setup procedure is repeated for each desired alarm zone. A secondary setup function establishes the machine center line. Transmitters positioned at the horizontal center of the machinery tracking zone allow the center line location to be recorded which is then saved in another data file of the system controller. In the method of use for specific machinery, a basic setup is completed whereby, for example multiple, concentric cylindrical alarm zones are defined within a cubical tracking zone. Once the zone geometry is set the operator can assign the available alarm devices for triggering by penetration of the transmitter of the operator as it enters the specific alarm zone, such as a flashing light for the outermost alarm zone. An audible alarm for the next or second inner alarm zone may likewise be utilized. Termination of power to the machinery is then set to prevent injury to the operator should the final or innermost alarm zone be penetrated.

DETAILED DESCRIPTION OF THE PREFERRED EMBODIMENTS AND OPERATION OF THE INVENTION

Figure 1:
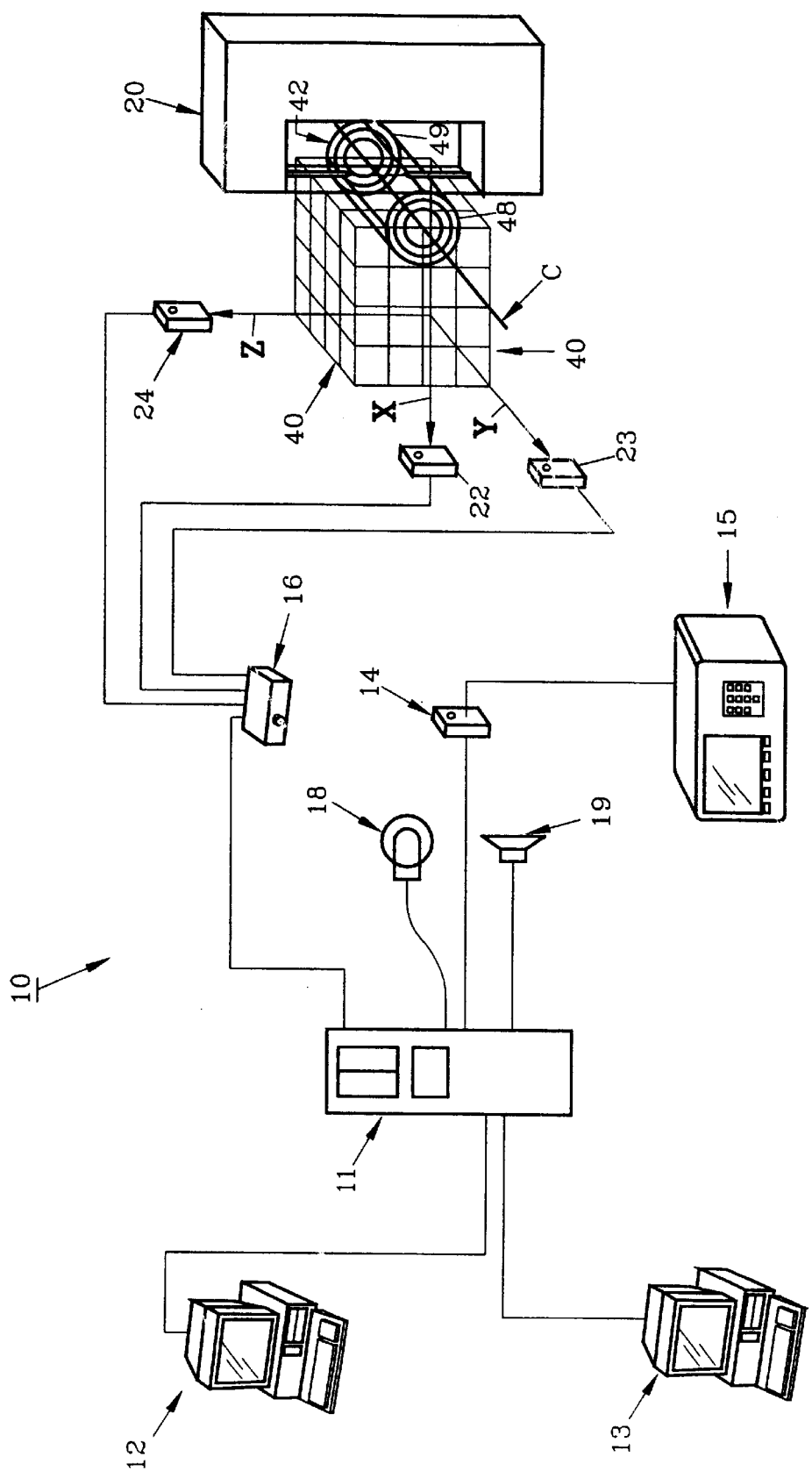
FIG. 1 shows in schematic representation the alarm system of the invention.
Figure 2:
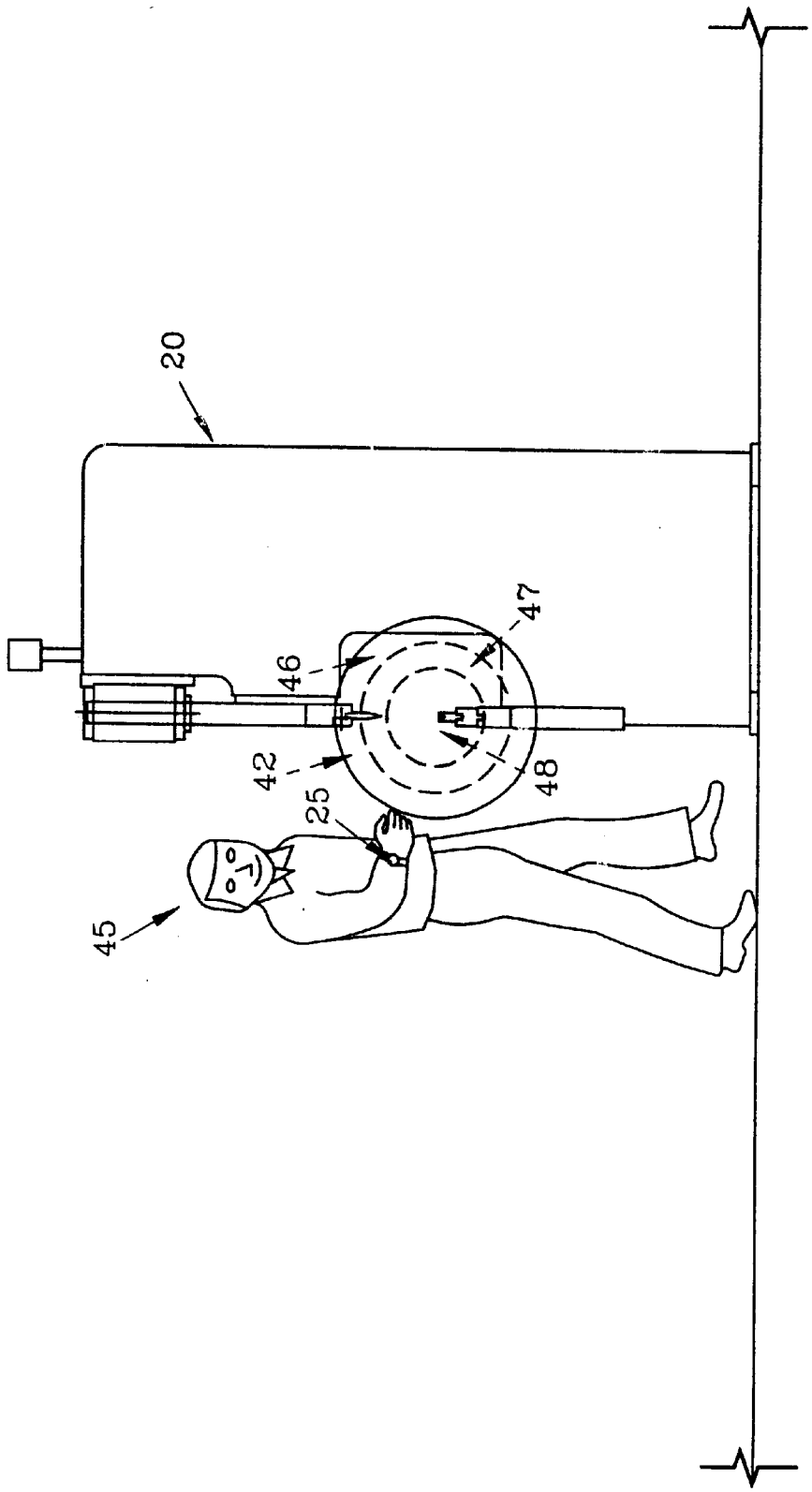
FIG. 2 demonstrates machinery used with the alarm zones.

For a better understanding of the invention and its operation, turning now to the drawings, FIG. 1 shows in schematic fashion preferred alarm system 10 used in conjunction with conventional metal shear 20, also seen in FIG. 2. Alarm system 10 includes system controller 11 which is preferably a Windows 95 based personal computer having a Pentium 300 megahertz (minimum) microprocessor and a 500 megabyte hard drive with two RS 232c ports, and one parallel printer port. Interface 12 comprising a monitor and keyboard is connected to system controller 11 and allows operational changes such as changing alarm zones for particular machinery. When alarm system 10 is in use, standard personal computer 13 connected to system controller 11 can be used if needed for programming for making program changes and adjustments.

System controller 11 includes machine interface 14 which consists of, preferably standard GE/Fanuc machine interface for connecting typical machine controller 15 to system controller 11. Machine interface 14 is preferably a GE/Fanuc PLC series 90–30 with CPU 331, input module and relay module as manufactured by GE/Fanuc of Charlottesville, Va. Also connected to system controller 11 is tracking controller 16 as manufactured by Lipman Electric Company of Israel under the mark "V-Scope VS 100". Tracking controller 16 is a proprietary controller having joined thereto receivers 22, 23 and 24 which receive signals at approximately 40 kilohertz from transmitter 25 as worn by machinery operator 45, seen in FIG. 2. Transmitter 25 is preferably wrist worn by machine operator 45. Also shown in FIG. 1 is visual alarm 18 and audio alarm 19 which are likewise connected to system controller 11.

Figure 3:
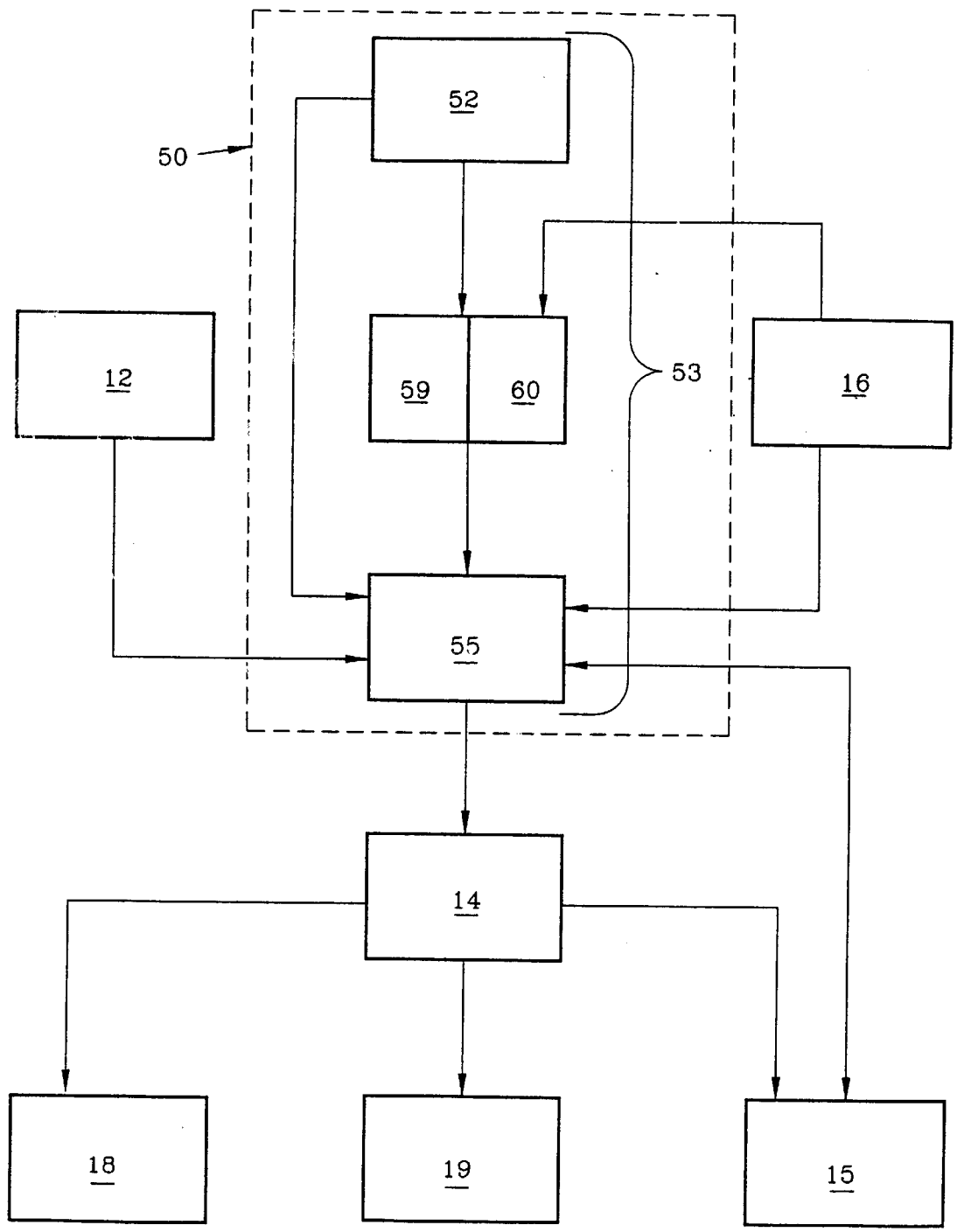
FIG. 3 features a logic diagram for the software and hardware of the alarm system.

The preferred method of use provides the creation of tracking zone 40 and includes the steps of first selecting particular machinery, such as metal shear 20 as seen in FIG. 2. Tracking zone 40 shown in FIG. 1 is first created which may be cubical in shape for alarm system 10 as seen in FIG. 1 whereby receivers 22, 23 and 24 are positioned along X, Y and Z coordinates relative to machine center line C. Tracking zone 40 is created at installation by positioning and rigidly mounting receiver units 22, 23 and 24 on or near metal shear 20. The relative location of receivers 22, 23 and 24 to each other is consistent with the selected manufacturer's specifications that define the maximum allowable distance between receivers for tracking zone 40. Tracking zone 40 is then mapped by moving transmitter 25 to a series of random points therewithin to insure that transmitter 25 is continually tracked. If transmitter 25 is "lost" within tracking zone 40 receivers 22, 23 or 24 which reports a loss of signal is repositioned until the signal is regained. The mapping process is repeated until desired tracking zone 40 is defined relative to metal shear 20. Boundary point locations for tracking zone 40 are recorded in the tracking zone database of reference module 52 (FIG. 3). The boundary point position data is determined by reading the position of transmitter 25 using tracking controller 16 and recording the same in reference module 52 using interface 12. The number of boundary points recorded will define the length, width and height of tracking zone 40.

Next, alarm zone 42 is created within tracking zone 40 as follows: At the start of each job for metal shear 20, operator 45 will define alarm zone axis C by first positioning transmitter 25 at a first point along axis C and recording in reference module 52 its location as the first axis point. Transmitter 25 is then repositioned to a second point along the desired axis and its location is again recorded as the second axis point. This alarm zone axis C data is recorded by operator 45 in the job data file within reference module 52 using interface 12.

Operator 45 using interface 12 then programs the size and function of alarm zone 42 by first entering right limit 48 and the left limit 49 of alarm zone 42 (FIG. 1) into job data file of reference module 52. Next operator 45 selects the shape of alarm zone 42 (round or rectangular) . If round (as seen in FIG. 1), operator 45 then enters the diameter of alarm zone 42 into the job data file into reference module 52 using interface 12. If rectangular, operator 45 enters the height and depth of the alarm zone. Lastly, operator 45 selects an alarm, such as visual alarm 18, audio alarm 19 or power termination that is to be initiated, as transmitter 25 enters alarm zone 42. Alarm zone 42 definition is now complete and the job data file is saved as conventional in reference module 52.

In use, if transmitter 25 is not present within tracking zone 40 metal shear 20 will not operate. If alarm zone 42 is not specified, metal shear 20 will not operate.

As further shown in FIG. 2, preferably three distinct cylindrically shaped alarm zones are created, outer alarm zone 46, intermediate alarm zone 47 and innermost alarm zone 48 along the longitudinal axis of machinery 20, extending along each side of center line C as shown in FIG. 1. Machine operator 45 as shown in FIG. 2 preferably wears wrist transmitter 25 although other types of transmitters and locations on operator 45 could be utilized. Initial alarm stage 46 may provide a flashing light such as from visual alarm 18 seen in FIG. 1 when penetrated. Should intermediate stage 47 be penetrated by the hand of operator 45, a loud audio alarm 19 shown in FIG. 1 is activated. Lastly, when innermost stage 48 is penetrated by the operator, system controller 11 then immediately shuts the power off to metal shear 20, thus preventing injury to operator 45. As preferred alarm zone 42 includes three distinct stages, and is cylindrical in configuration, accidents are prevented regardless of the angle or direction of zone entry.

In FIG. 3 a schematic diagram shows a logic diagram in which software 50 includes reference module 52, analysis module 53 and supervisory output module 55. Reference module 52 allows for the setup of data files that define parameters for shear 20 such as tracking zone 40 (FIG. 1) and alarm zones 46, 47 and 48 seen in FIG. 2. Analysis module 53 interprets the real time position data received from tracking controller 16, calculates the direction and velocity of transmitters 22, 23 and 24 and compares real time position data from transmitters 22, 23 and 24 with previously programmed safety zone and alarm zone data. When intercepts of real time data and programmed data are recognized, analysis module 53 initiates preprogrammed responses. Supervisory output module 55 responds to signals within analysis module 53 and generates an output signal to trigger a preprogrammed response as appropriate, for example an audible signal by audible alarm 19.

Reference module 52 contains a library of data files that define parameters for shear 20 such as safety zone limits and other data, such as specific job data. Each of the data files therein is set up through machine interface 12 using input screens programmed in Visual Basic. Configuration files in reference module 52 contain information defining physical dimensions of tracking zone 40 (FIG. 1) and alarm zones 46, 47 and 48 (FIG. 2). The tracking zone data contains information defining the size of the tracking zone, the location of the tracking zone relative to shear 20 and the alarms such as visual alarm 18 and audible alarm 19 (FIG. 1) that are available for response. The job data files contain, for example information specific to each job to be processed on metal shear 20. The job data files include alarm zones 46, 47 and 48, spacial definitions, locations and alarm response types. Reference module 52 physically resides in system controller 11 as shown in FIG. 1.

Analysis module 53 as shown in FIG. 3 is comprised of two sections (54 and 55). Section 54 is for determination of transmitter 22, 23 and 24 locations and for calculation of the direction and velocity of transmitters 22, 23, and 24. Section 55 is used to initiate supervisory decisions to trigger outputs. Section 54 has two sub-modules; 1) a position detection sub-module 59 and 2) a velocity control sub-module 60. Position detection sub-module 59 receives real time position data through section 54 for each transmitter 22, 23 and 24. Sub-module 59 then calculates the offset required for each transmitter position, to shift the location definition for transmitters 22, 23 and 24 from section 54 frame of reference to the frame of reference for shear 20. Velocity control sub-module 60 uses real time position data received through section 54 for each transmitter 22, 23, 24 to calculate the velocity and direction of movement of each. Section 55 compares the data calculated in section 54 with the data stored in reference module 52 to determine when an alarm response should be initiated and the alarm type. Section 55 monitors machine controller 15 and tracking controller 16 for irregularities and generates an alarm response if either controller (15, 16) exhibits a fault. Sub-module 59 physically resides in system controller 11.

Output software is written for machine interface PLC 14 that receives direction from output module 55 and initiates the requested response by triggering visual alarm 18, audio alarm 19 or machine controller 15 interrupt. Output module 55 resides in machine interface 14.

The illustrations and examples provided herein are for explanatory purposes and are not intended to limit the scope of the appended claims.

We claim:

1. An alarm system for a machine comprising: a computer, a movable transmitter, a plurality of fixed receivers, said receivers each in communication with said transmitter, said receivers each in communication with said computer, an alarm, said alarm connected to said computer, said receivers defining a tracking zone and an alarm zone about said machine whereby said computer tracks the movement of said transmitter within said tracking zone and activates said alarm when said transmitter enters said alarm zone.

2. The alarm system of claim 1 wherein said plurality of receivers comprises three receivers.

3. The alarm system of claim 1 wherein said alarm zone is within said tracking zone.

4. The alarm system of claim 1 wherein said alarm zone comprises multiple stages.

5. The alarm system of claim 1 wherein said tracking zone is rectangularly shaped.

6. The alarm system of claim 1 wherein said alarm zone is cylindrically shaped.

7. The alarm system of claim 1 wherein said alarm zone is within said tracking zone.

8. The alarm system of claim 1 further comprising a machine controller, said machine controller in communication with said computer.

9. The alarm system of claim 1 further comprising a tracking system controller, said tracking system controller connected to each of said receivers.

10. An alarm system for a machine comprising: a computer, a movable transmitter, a trio of fixed receivers, said receivers defining a tracking zone about said machine, said receivers defining an alarm zone within said tracking zone, said transmitter in communication with each of said receivers, a tracking system controller, each of said receivers connected to said tracking system controller, said tracking system controller connected to said computer, an alarm, said alarm connected to said computer software, said software for operating said computer whereby said computer tracks said transmitter within said tracking zone and activates said alarm when said transmitter enters said alarm zone.

11. The alarm system of claim 10 wherein said transmitter is worn by a machine operator.

12. The alarm system of claim 10 wherein said receivers define a rectangularly shaped 3-D tracking zone.

13. The alarm system of claim 10 wherein said receivers define a cylindrically shaped alarm zone.

14. The alarm system of claim 13 wherein said alarm zone is contained within said tracking zone.

15. The alarm system of claim 10 wherein said alarm zone comprises a first and a second stage.

16. A method for enhancing the safety of personnel near a machine comprising the steps of:
   a) creating a tracking zone about the machine;
   b) creating an alarm zone proximate the tracking zone;
   c) placing a transmitter on the personnel;
   d) tracking the transmitter within the tracking zone; and
   e) alarming the personnel when the transmitter penetrates the alarm zone.

17. The method of claim 16 wherein creating a tracking zone comprises the step of defining a tracking zone within a trio of receivers in communication within said transmitter.

18. The method of claim 16 wherein creating an alarm zone comprises the step of defining an alarm zone utility a trio of receivers in communication with said transmitters.

19. The method of claim 16 wherein placing a transmitter on the personnel comprises the step of placing the transmitter on the arm of the personnel.

20. The method of claim 16 wherein alarming the personnel comprises alarming the personnel with a visual alarm.

* * * * *